(12) United States Patent
Farneti

(10) Patent No.: US 7,547,172 B2
(45) Date of Patent: Jun. 16, 2009

(54) MACHINE TO COVER ARTICLES OF VARIOUS TYPE, PARTICULARLY BOOK COVERS

(75) Inventor: Aldo Farneti, Milan (IT)

(73) Assignee: CoLibri System S.p.A., Milan (IT)

( * ) Notice: Subject to any disclaimer, the term of this patent is extended or adjusted under 35 U.S.C. 154(b) by 639 days.

(21) Appl. No.: 10/508,508

(22) Filed: Sep. 16, 2004

(65) Prior Publication Data

US 2006/0153664 A1    Jul. 13, 2006

(51) Int. Cl.
*B42C 11/02* (2006.01)
*B42C 11/00* (2006.01)

(52) U.S. Cl. ......................................... 412/19; 412/18
(58) Field of Classification Search ...................... 412/1, 412/3, 6, 9, 16–19, 21–24, 33, 38, 41, 902; 53/374.8, 374.9, 375.6; 156/583.8, 583.9
See application file for complete search history.

(56) References Cited

U.S. PATENT DOCUMENTS

| | | | | |
|---|---|---|---|---|
| 2,943,336 A | * | 7/1960 | Neilon et al. | 412/24 |
| 3,035,381 A | * | 5/1962 | Hosso | 53/568 |
| 3,038,181 A | * | 6/1962 | Nadherny | 412/41 |
| 3,378,991 A | * | 4/1968 | Anderson | 53/329.3 |
| 3,471,990 A | | 10/1969 | Bonuchi et al. | 53/22 |
| 3,756,625 A | * | 9/1973 | Abilgaard et al. | 412/7 |
| 3,869,842 A | * | 3/1975 | Verbeke | 53/413 |
| 3,939,513 A | * | 2/1976 | Crathern et al. | 412/1 |
| 3,943,031 A | * | 3/1976 | Krueger et al. | 156/583.1 |
| 4,149,288 A | * | 4/1979 | Sendor et al. | 412/6 |
| 5,056,295 A | * | 10/1991 | Williams | 53/450 |
| 5,177,937 A | * | 1/1993 | Alden | 53/479 |
| 5,277,745 A | * | 1/1994 | Williams | 156/583.1 |
| 5,308,209 A | * | 5/1994 | Crudo et al. | 412/15 |
| 5,501,765 A | * | 3/1996 | Hashimoto | 156/583.3 |
| 5,915,904 A | * | 6/1999 | Hefty | 412/34 |
| 6,210,092 B1 | * | 4/2001 | von Rohrscheidt | 412/40 |

FOREIGN PATENT DOCUMENTS

EP          0908328 A1     4/1999

* cited by examiner

*Primary Examiner*—Dana Ross
*Assistant Examiner*—Pradeep C Battula
(74) *Attorney, Agent, or Firm*—Jacobson Holman PLLC

(57) ABSTRACT

A machine to cover articles with flexible plastic material sheets. The machine includes an assembly for heat-sealing and cutting the sheets which cooperates with a work surface. The assembly includes a first and a second element, of which at least the first element is movable with respect to the other, and the two elements being arranged on opposite sides of the work surface. The first element includes a cutting and sealing blade having an electric current which passes through it and the second element including a cutting and sealing counter blade. Operation levers are provided to move the cutting and sealing blade from a rest position to a work position where the cutting and sealing blade engages the cutting and sealing counter blade. The first element and the levers belong to a unit connected to the work surface in a removable manner. The unit also includes elastic portions for holding the blade at a rest position.

2 Claims, 5 Drawing Sheets

MACHINE TO COVER ARTICLES OF VARIOUS TYPE, PARTICULARLY BOOK COVERS

This is a continuation of PCT/IT01/00354 filed Jul. 4, 2001 and published in English.

FIELD OF THE INVENTION

The present invention refers to a machine to cover articles of various type, particularly but not exclusively book covers.

BACKGROUND OF THE INVENTION

Machines to cover books by means of suitable plastic material sheets are known. Typically such machines are heavy and they may be used only in industry.

A machine to cover the book covers which may be used in offices or similar is described in EP-A-0908328. Such machine comprises an assembly for cutting and heat-sealing plastic material sheets which are suitable to cover the book covers, which cooperates with a work surface. The assembly comprises two elements of which one is movable with respect to the other and the two elements are arranged on opposite sides of the work surface. The movable element comprises a cutting and sealing blade having an electric current passing therethrough and it is moved by suitable drive means which allow to cut and simultaneously to heat-seal the sheets. The other element is fixed and acts as a cutting and heat-sealing counter blade.

Such machine is more compact and lighter than an industry machine; however it is manufactured in a single piece showing certain dimensions.

SUMMARY OF THE INVENTION

In view of the state of the art described, it is object of the present invention to form a machine to cover book covers and articles of various type which comprises detachable pieces and thus it is more versatile than the known machines.

According to the present invention, such an object is obtained by means of a machine to cover articles with flexible plastic material sheets, comprising an assembly for heat-sealing and cutting the sheets which cooperates with a work surface, said assembly comprising a first and a second element, of which at least the first element is movable with respect to the other, and the two elements being arranged on opposite sides of the work surface, said first element comprising a cutting and sealing blade having an electric current which passes through it and said second element comprising a cutting and sealing counter blade, operation means being provided to move said cutting and sealing blade from a rest position to a work position where said cutting and sealing blade engages said cutting and sealing counter blade, characterized in that said first element and said operation means belong to a unit connected to the work surface in a removable manner, said unit comprising also elastic means for holding said blade at rest position.

BRIEF DESCRIPTION OF THE DRAWINGS

The features and the advantages of the present invention will be made evident by the following detailed description of an embodiment thereof, shown as not limiting example in the annexed drawings, wherein.

DETAILED DESCRIPTION OF THE PREFERRED EMBODIMENT

Figure 1:
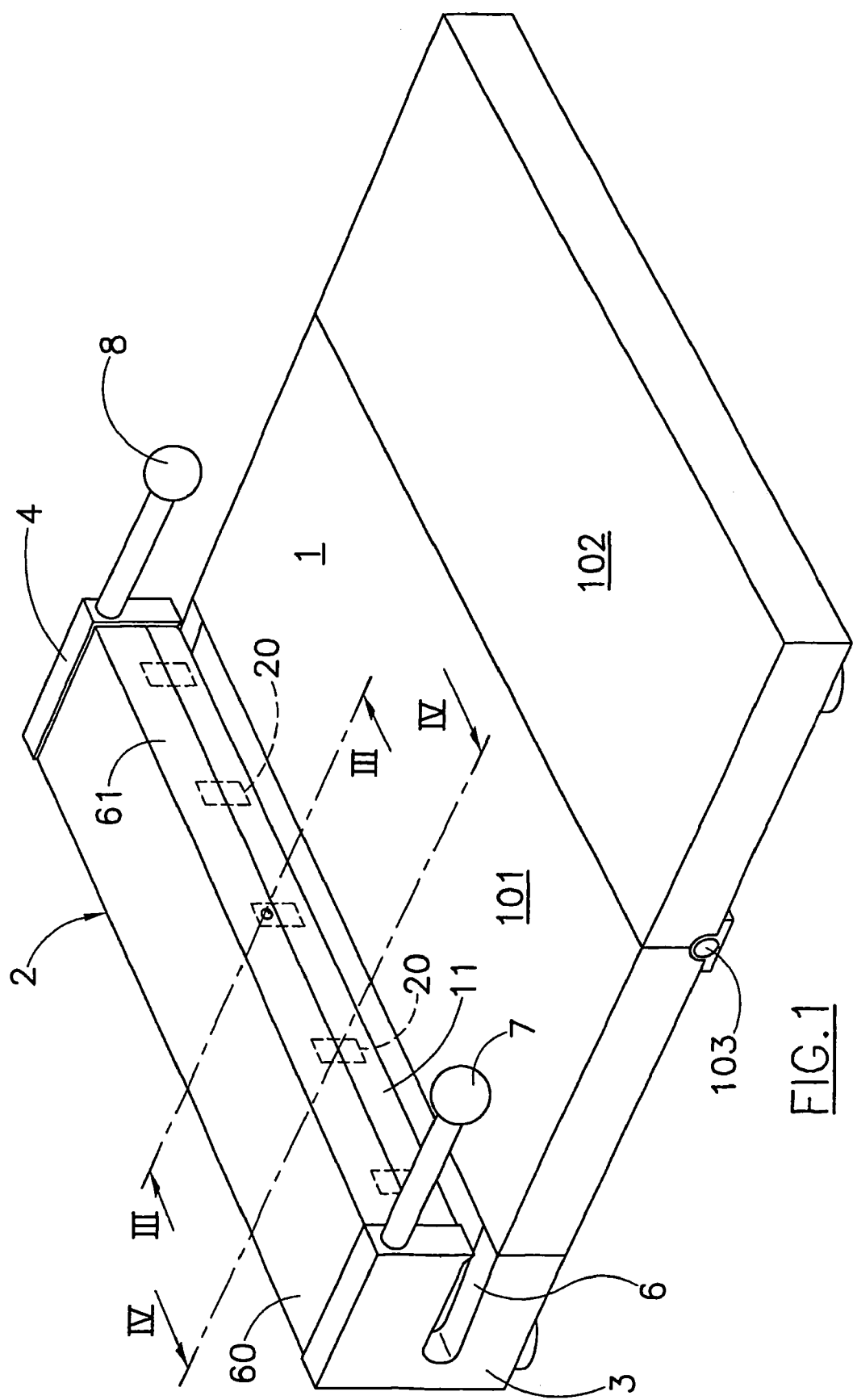
FIG. 1 is a perspective view, at rest position, of a machine to cover articles according to present invention.

With reference to FIGS. 1-5 a machine to cover articles according to present invention is shown. Such machine uses flexible plastic material sheets to cover articles of various type particularly book covers, and it comprises a work plane or work surface 1 and a unit 2 connected in a removable manner to the work surface 1.

The unit 2 is connected to the work surface 1 at flexible lateral walls 3 and 4 which are connected to one other by means of a traverse 60 and which are provided with pins 5 to connect them to the work surface 1; each of said lateral walls 3 and 4 has in the middle a U-shaped groove rotated anti-clockwise of ky 90° degrees. Levers 7 and 8 are fixed respectively to the top of the lateral walls 3 and 4.

The unit 2 comprises a longitudinal cutting and heat-sealing blade 11 connected to the frontal part 61 of the traverse 60. Said blade 11 is provided with plate-shaped projections 20 which are embedded inside suitable seats 21 of the part 61; one of said plate-shaped projections 20 is provided with a hole 22 to receive a nut 23 for fixedly connecting the blade 11 to the unit 2.

The longitudinal cutting and heat-sealing blade 11 belongs to an assembly for cutting and heat-sealing sheets which cooperates with the work surface 1 and which comprises also a cutting and heat-sealing counter blade 12 allocated in the work surface 1. The blade 11 is movable with respect to the counter blade 12 and both the blade 11 and the counter blade 12 are arranged on opposite sides of the work surface 1. The movement of the blade 11 is obtained by acting on the levers 7 and 8 so as to overcome the elasticity given to the lateral walls 3 and 4 by the groove 6 and in this way the blade 11 is moved from a rest position, shown in FIGS. 3 and 4, to a work position, shown in FIG. 5, wherein the blade 11 engages the counter blade 12.

A heating element that belongs to the blade 11, for example an electric resistor constituted of a wire through which an electric current passes, which is not shown in the FIGS., is provided. The current in the wire resistor of the blade 11 is supplied by an electric circuit 200 which is allocated in the top part of the unit 2 and which is supplied by a main voltage transformer arranged inside or outside the machine.

Figure 2:
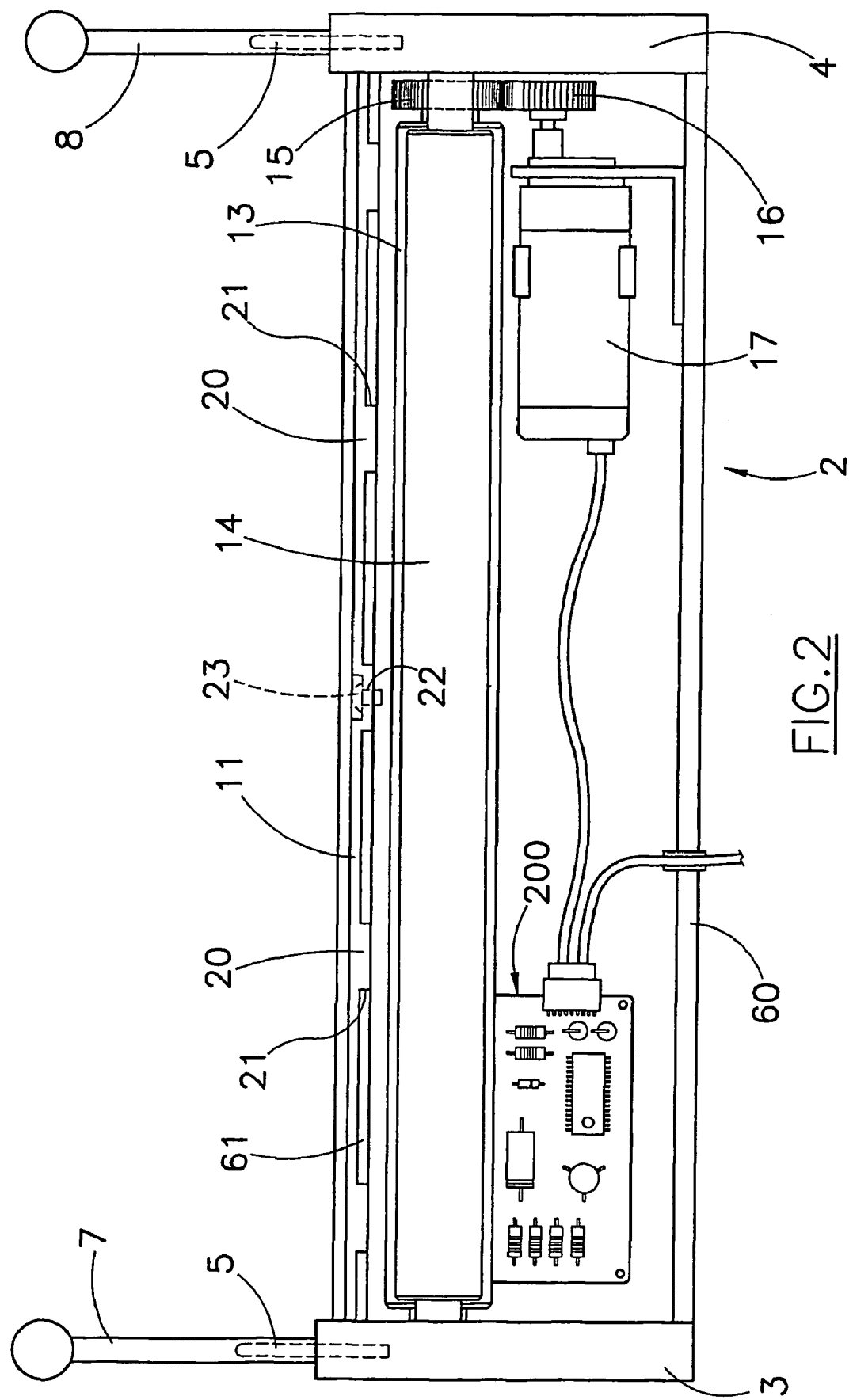
FIG. 2 is a below view of a removable unit of the machine in FIG. 1.
Figure 3:
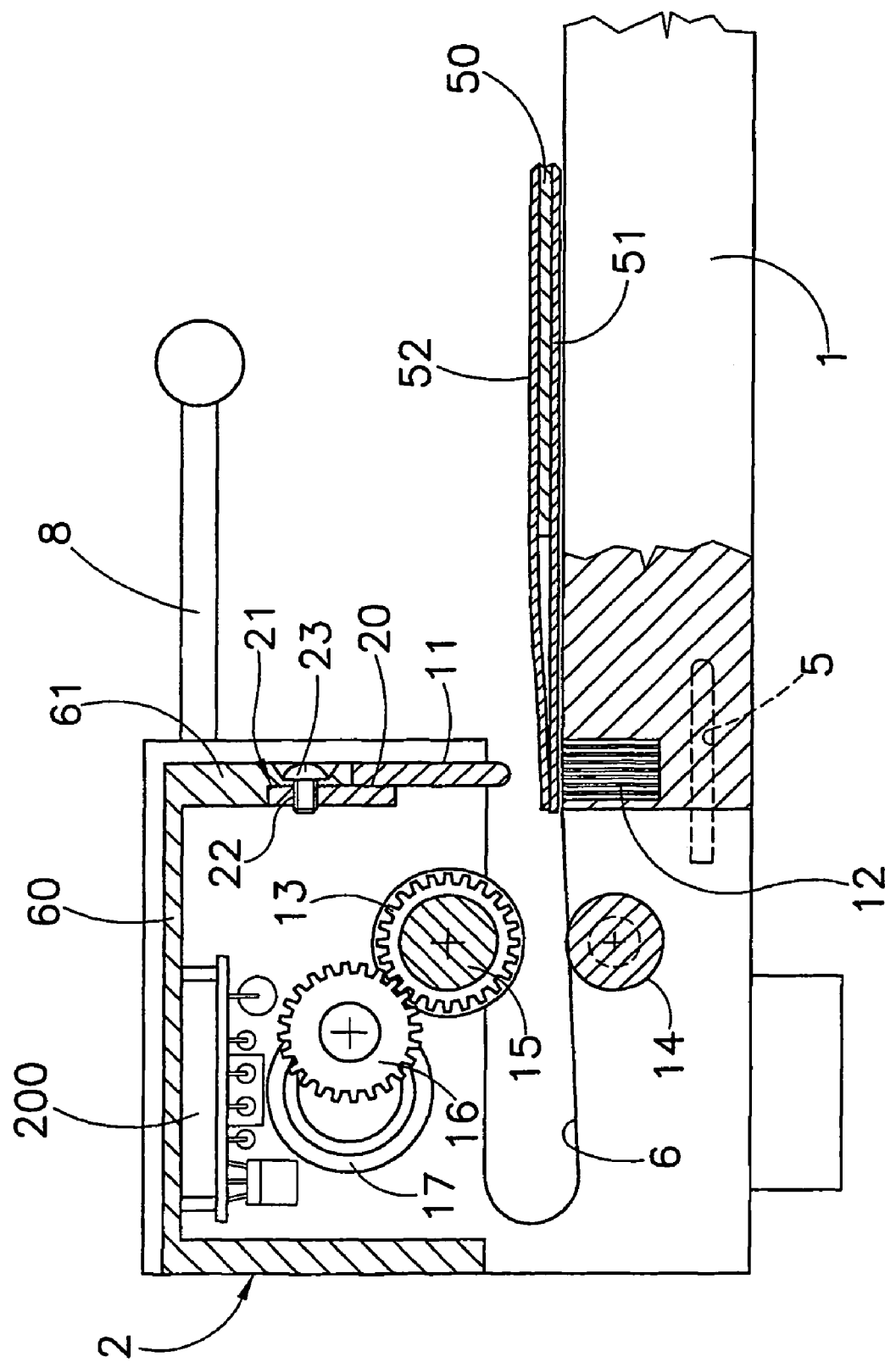
FIG. 3 is a section view of the machine in FIG. 1 according to line III-III.
Figure 4:
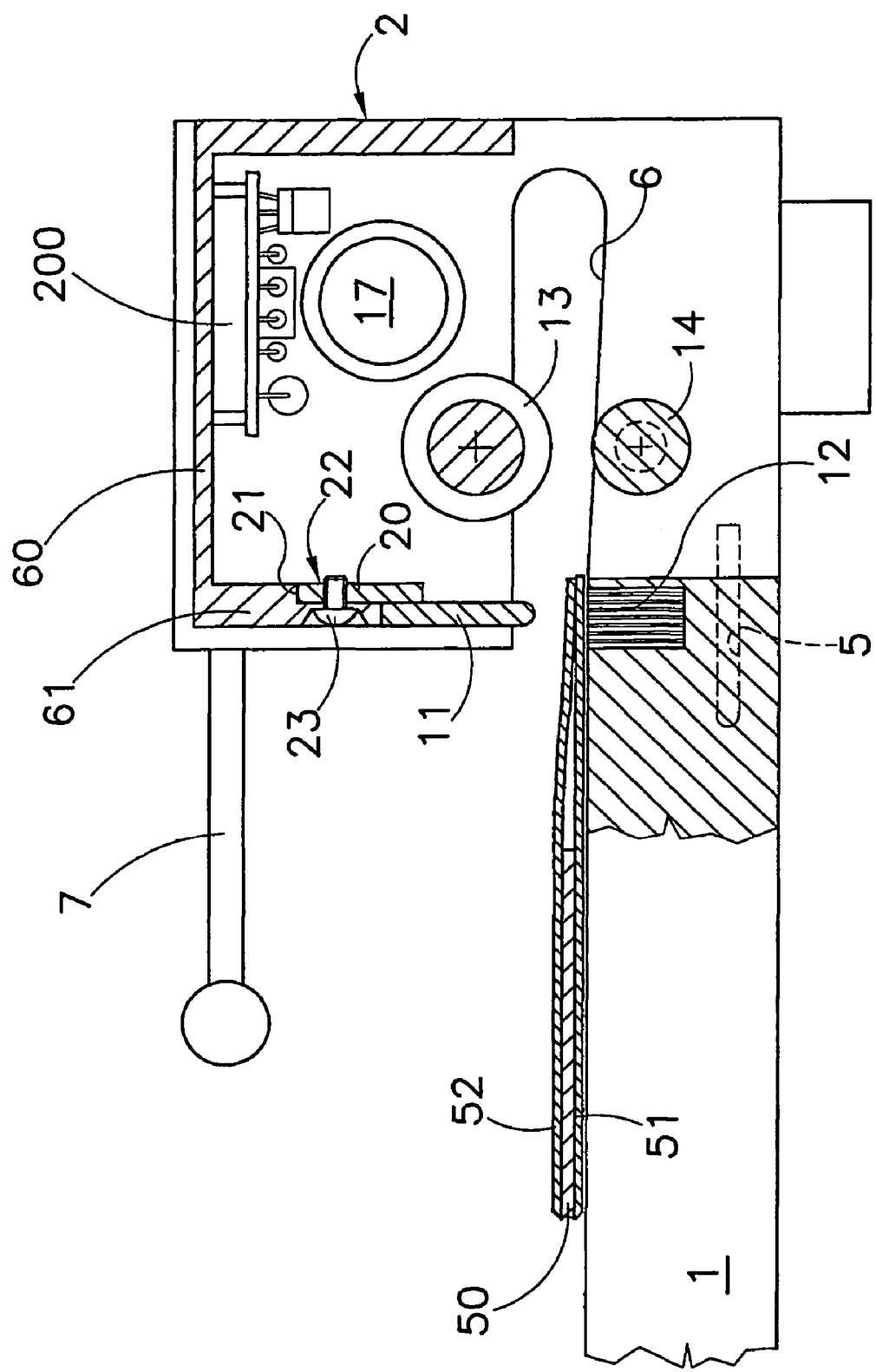
FIG. 4 is a section view of the machine in FIG. 1 according to line IV-IV.

The unit 2 comprises also two circular rollers 13 and 14 with different diameters, which are more visible in FIG. 2, and which are arranged one opposite the other near the groove 6 of the lateral walls 3 and 4 and which are longitudinal to the unit 2. The roller 13, which has a diameter greater than the roller 14, shows a toothed wheel 15 at one end which is able to engage itself with another toothed wheel 16 moved by means of an electric motor 17 supplied by the electric circuit 200.

Figure 5:
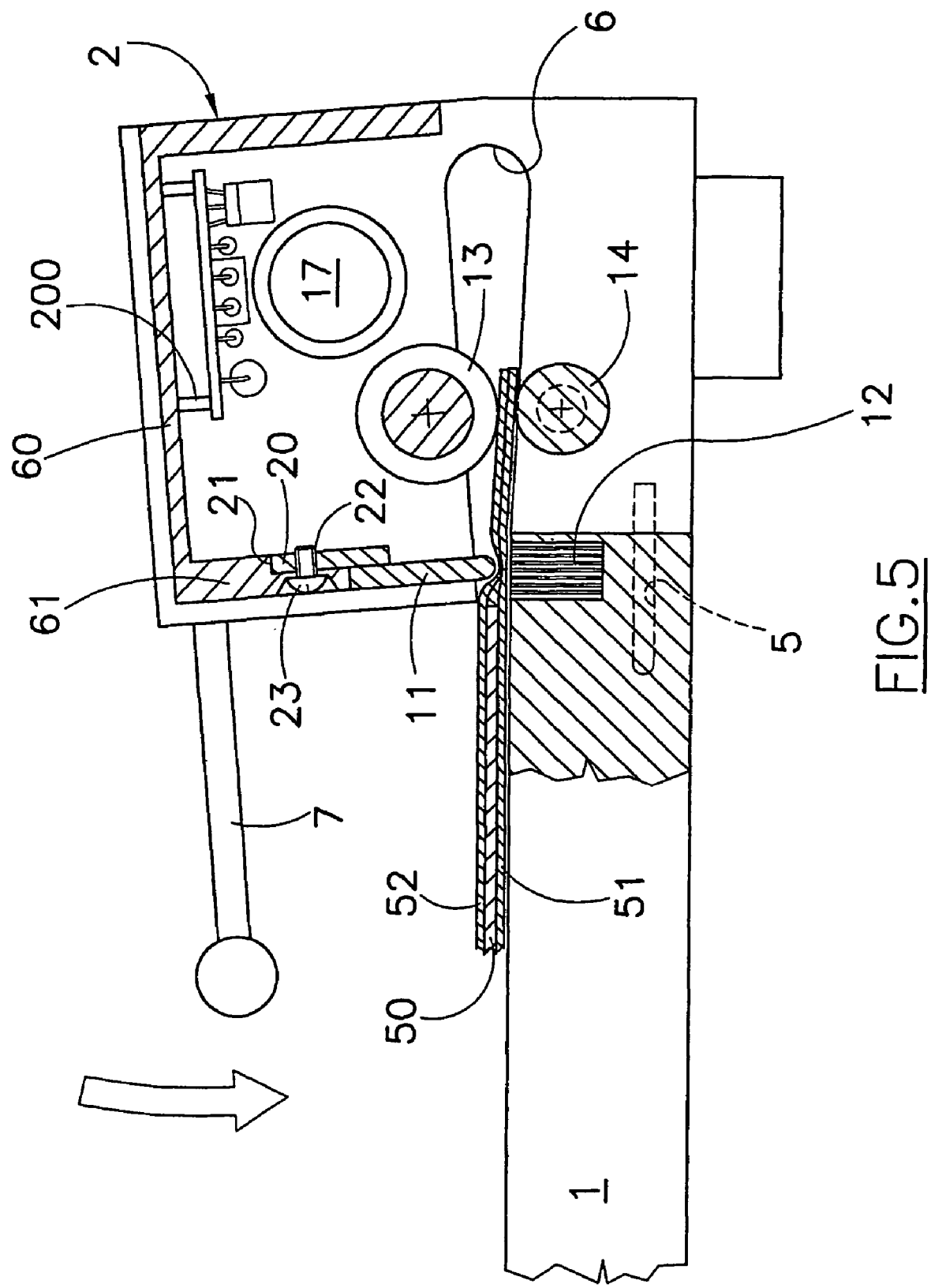
FIG. 5 is a section view similar to that in FIG. 4 but with the blade lowered at work position.

The operations that the user has to carry out to cover the book or other article covers are similar to those described in the patent application EP 0908328. Particularly in FIGS. 3 and 4 there is shown a cover 50 of a book which is covered with flexible plastic material sheets 51 and 52 and which is placed between the blade 11 and the counter blade 12. The levers 7 and 8 are operated by pushing them downward and this allows closing the grooves 6 of the lateral walls 3 and 4 and to lower the blade 11 against the counter blade 12, as shown in FIG. 5; in this way the levers 7 and 8 allow the movement of the cutting and heat-sealing blade 11 from a rest position, shown in FIGS. 3 and 4, to a work position, shown in FIG. 5, where the blade 11 engages the counter blade 12.

With the blade 11 lowered, automatically or by means of a suitable push button, the electric circuit 200 is activated which allows the electric current to pass through the resistor of the blade 11 for a prefixed time period. This allows the heat-sealing of the plastic sheets 51 and 52.

With the blade 11 lowered against the counter blade 12, the roller 14 is arranged against the roller 13; the part of the plastic sheets 51 and 52 which must be removed is placed between the rollers 13 and 14.

When the electric current flux through the wire resistor is interrupted, again automatically or by means of a suitable push button, the electric motor 17 is activated which allows the roller 13 to rotate for a short time period that is sufficient to remove the exceeding part of the sheets 51 and 52 and to discharge it outside the machine.

The machine shown in FIGS. 1-5 is compact and easy to transport. In fact the work surface 1 comprises preferably two parts 101 and 102 which are hinged at 103 and are overturning in order to make easy the transport, while the unit 2 is easy to remove from the work surface 1 by acting on the pins 5.

The blade 11 is also easy to remove from the unit 2 for the necessary clean or substitution operation by acting only on the nut 23.

The invention claimed is:

1. Machine to cover articles with flexible plastic material sheets, the machine comprising
   an assembly for heat-sealing and cutting the sheets which cooperates with a work surface,
   said assembly including a first and a second element, of which at least the first element is movable with respect to the other, and the two elements being arranged on opposite sides of the work surface,
   said first element including a cutting and sealing blade having an electric current which passes through the cutting and sealing blade and said second element including a cutting and sealing counter blade,
   operation means for moving said cutting and sealing blade from a rest position to a work position where said cutting and sealing blade engages said cutting and sealing counter blade to seal the plastic material sheets along a continuous line,
   said first element and said operation means belong to a unit connected to the work surface in a removable manner,
   said unit including elastic means for holding said blade at the rest position and for bringing said cutting and sealing blade back automatically to the rest position after the cutting and sealing blade is moved to the work position,
   said cutting and sealing blade being provided with projections inserted inside seats of said unit, said blade including at least a hole for fixing said blade to said unit by a nut so that said blade is easy to remove from said unit.

2. Machine to cover articles with flexible plastic material sheets, the machine comprising
   an assembly for heat-sealing and cutting the sheets which cooperates with a work surface,
   said assembly including a first and a second element, of which at least the first element is movable with respect to the other, and the two elements being arranged on opposite sides of the work surface,
   said first element including a cutting and sealing blade having an electric current which passes through the cutting and sealing blade and said second element including a cutting and sealing counter blade,
   operation means for moving said cutting and sealing blade from a rest position to a work position where said cutting and sealing blade engages said cutting and sealing counter blade to seal the plastic material sheets along a continuous line,
   said first element and said operation means belong to a unit connected to the work surface in a removable manner,
   said unit including elastic means for holding said blade at the rest position and for bringing said cutting and sealing blade back automatically to the rest position after the cutting and sealing blade is moved to the work position,
   said elastic means being constituted of lateral walls arranged to a side of said unit and each of said elastic means having in a middle a U-shaped groove rotated anticlockwise by 90° degrees, said lateral walls being connected to one another by a traverse over said groove and connected to the work surface under said groove.

* * * * *